United States Patent [19]
Hines, Jr.

[11] Patent Number: 6,007,128
[45] Date of Patent: Dec. 28, 1999

[54] CARRY-ALL BOX FOR MOUNTING ON VEHICLE BEDS

[76] Inventor: Robert S. Hines, Jr., 408 State of Franklin Rd. #42, Johnson City, Tenn. 37604

[21] Appl. No.: 09/178,094

[22] Filed: Oct. 23, 1998

[51] Int. Cl.$^6$ ........................................ B60R 9/06
[52] U.S. Cl. ......................... 296/37.6; 224/282; 224/404
[58] Field of Search ............................ 296/37.6; 224/282, 224/403, 404, 539, 540, 541

[56] References Cited

U.S. PATENT DOCUMENTS

| | | | |
|---|---|---|---|
| 4,085,961 | 4/1978 | Brown | 296/37.6 |
| 4,564,167 | 1/1986 | Smith | 224/552 |
| 4,635,992 | 1/1987 | Hamilton et al. | 296/37.6 |
| 4,752,095 | 6/1988 | Brady | 296/37.6 |
| 4,789,195 | 12/1988 | Fletcher | 296/37.6 |
| 4,946,215 | 8/1990 | Taylor | 296/37.6 |
| 4,971,234 | 11/1990 | Hay | 224/42.32 |
| 5,076,630 | 12/1991 | Henriquez | 296/37.6 |
| 5,088,636 | 2/1992 | Barajas | 224/281 |
| 5,121,959 | 6/1992 | King | 296/37.6 |
| 5,398,987 | 3/1995 | Sturgis | 296/37.6 |
| 5,535,931 | 7/1996 | Barlow et al. | 224/404 |

*Primary Examiner*—D. Glenn Dayoan
*Assistant Examiner*—Paul Chenevert

[57] ABSTRACT

A carry-all box for use in combination with a vehicle bed having a floor and first and second sides, the box having an elongated, generally rectangular configuration and having first and second end sections, a front side, a rear side, and a bottom to which the end sections and sides are affixed and extend generally upwardly, a pivot mechanism having a hinge component on the vehicle bed adjacent the first side thereof and a cooperating hinge component on the first end section of the box for allowing the box to pivot in an arc path substantially in a plane parallel to the plane of the bed between a generally lateral forward position and a generally longitudinal rearward position relative to the bed, the end sections, sides and bottom of the box being dimensioned to extend substantially laterally across the bed while allowing the second end section to clear any obstruction which may be in its arc path such as a bed side or wheel well housing.

22 Claims, 4 Drawing Sheets

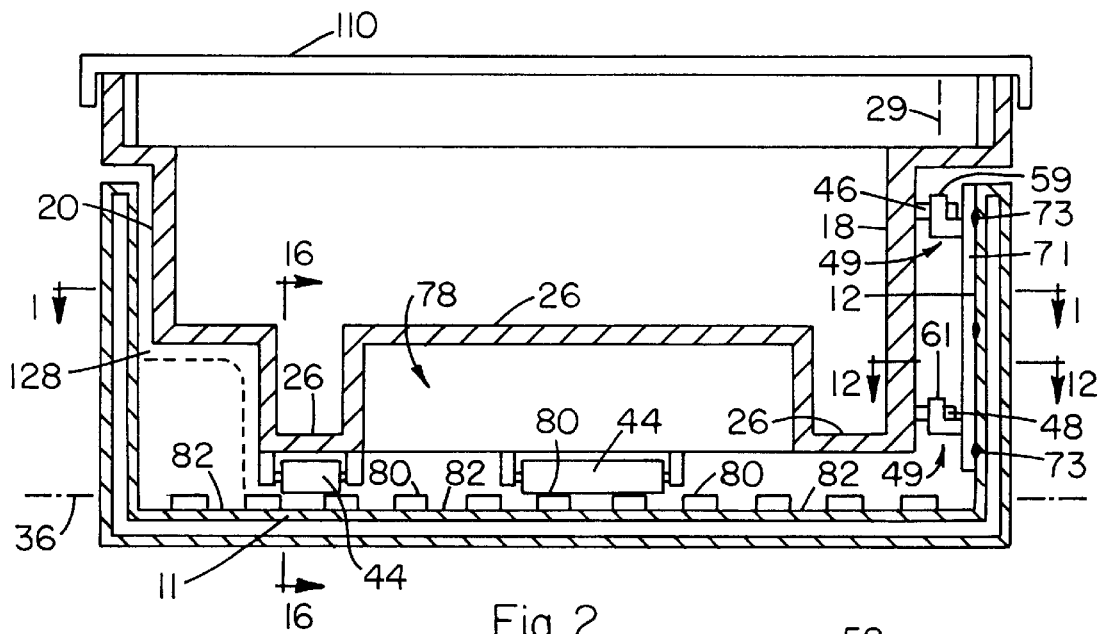
Fig. 2
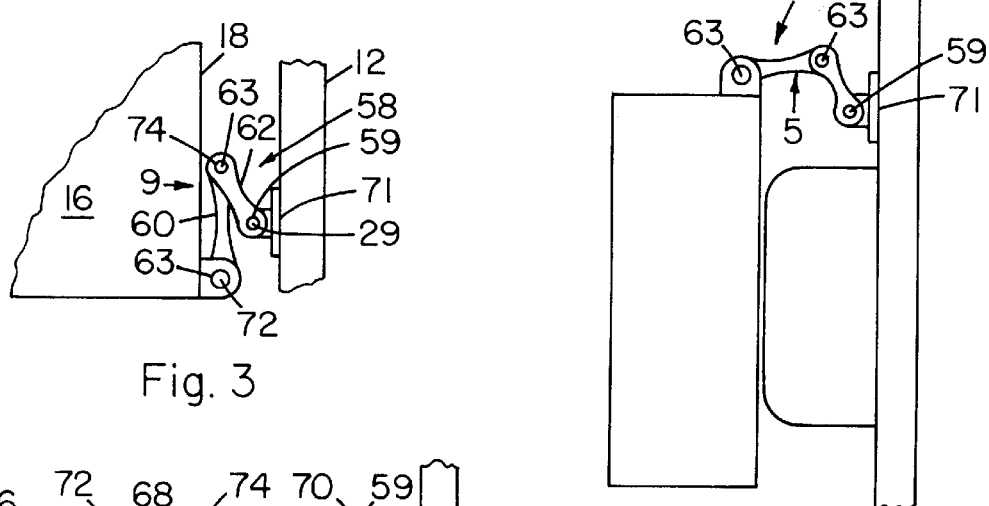
Fig. 3
Fig. 4
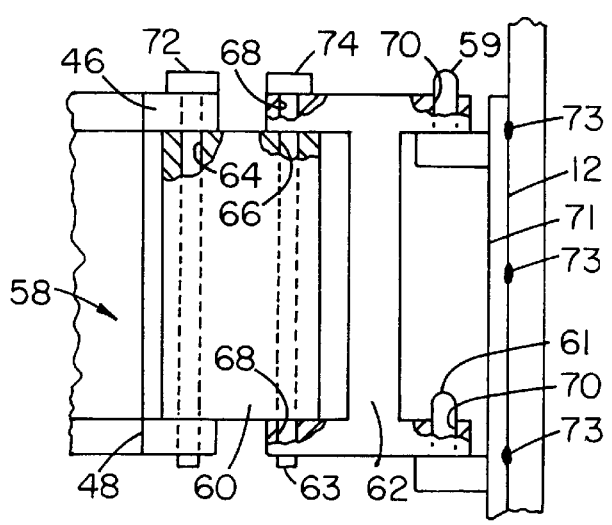
Fig. 5
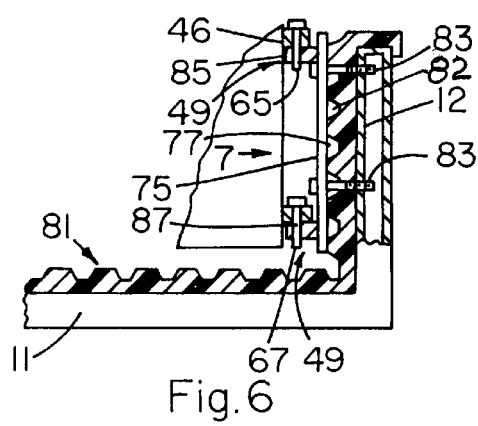
Fig. 6

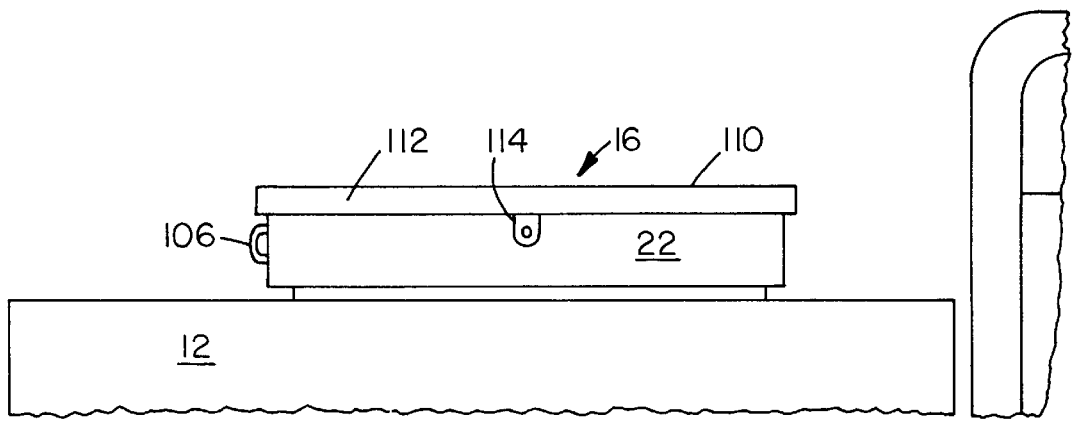
Fig. 13
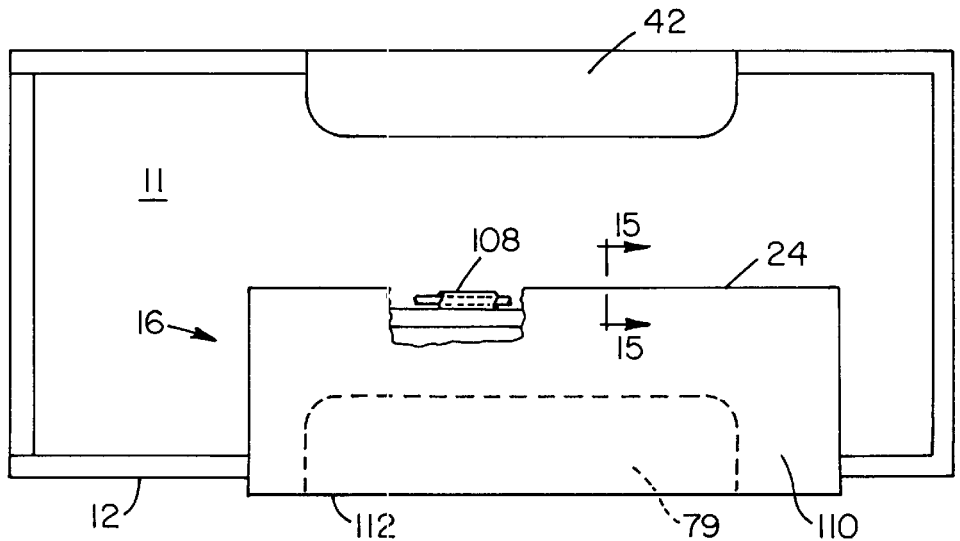
Fig. 14
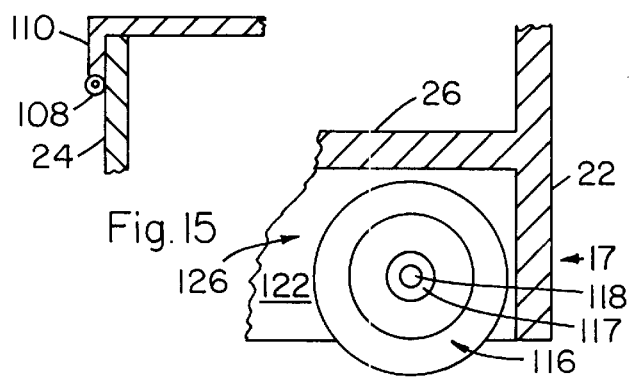
Fig. 15
Fig. 16
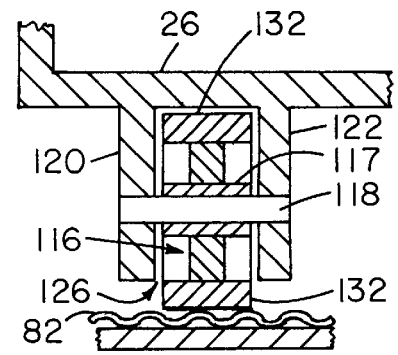
Fig. 17

CARRY-ALL BOX FOR MOUNTING ON VEHICLE BEDS

BACKGROUND OF THE INVENTION

1. Field

This invention concerns carry-all type boxes for placement on vehicle beds such as on pick-up trucks, and particularly concerns unique structural modifications of such boxes which conventionally are fixed in position at the forward end of the truck bed and extend laterally substantially between the full interior width of the bed. Such boxes present many difficulties to the user in that the lifting of items such as heavy tools or even golf clubs or the like out of the box, particularly at arms length, typically leads to serious injury to the back and, of course, lost time at the job or elsewhere.

The present structural modifications and improvements greatly enhance the utility and ease of use of such boxes by providing mechanisms which allow the box to be swung into a position adjacent the side of the bed whereby easy access to the box and items therein is afforded.

2. Prior Art

Heretofore, no practical means has been proposed for allowing significant position adjustments for such boxes. U.S. Pat. Nos.: 4,564,167; 4,085,961; and 4,971,234 show specialized box and positioning structure therefor, but do not suggest employing a modified typical carry,-all box of the type shown, for example, in U.S. Pat. Nos. 5,121,959 and 5,088,636 which are boxes that extend lateral substantially all the way across the truck bed, and the disclosure of which are hereby incorporated herein in their entirety.

Objects, therefore of the present invention area: to provide structural engineering modifications to such conventional boxes which allows the boxes to be easily repositioned along the side of a vehicle bed for unloading and reloading thereof, and then easily repositioned laterally across the front of the bed; to provide such modifications which require very little intrusion into the structure of the vehicle itself; to provide such modifications which smoothly function on the metal flat or ribbed bed surface of a truck, and also on a ribbed or corrugated plastic bed liner; and to provide such modifications which add little additional cost to the box and which requires minimal installation time and effort.

SUMMARY OF THE INVENTION

These and other objects hereinafter becoming evident have been attained in accordance with the present invention thru the discovery of unique structural engineering modifications of such boxes, which, in their broad embodiments in combination with a vehicle bed having a floor and first and second sides, may be characterized as an elongated, generally rectangular carry-all box having first and second end sections, a front side and a rear side, and bottom means to which said end sections and sides are affixed and extend generally upwardly, pivot means having cooperating pivot hinge components on said bed adjacent said first side thereof and on said first end section of said box for allowing said box to pivot in an arc path substantially in a plane parallel to the plane of said bed between a generally lateral forward position and a generally longitudinal rearward position relative to said bed, said end sections, sides and bottom means of said box being dimensioned to extend substantially laterally across the bed while allowing said second end section to clear any obstruction which may be in its arc path such as a bed side or wheel well housing.

In certain preferred embodiments (a) roller means are provided on said box for contacting said bed floor and rollably supporting said box;

(b) said roller means is oriented to bridge the gaps in a corrugated truck bed or plastic bed liner for allowing smooth rolling of said roller means thru said arc path;

(c) said pivot means is double jointed to allow lateral movement of said box as well as pivotal movement whereby said box can be pivoted to lie substantially longitudinally of said bed and adjacent a wheel well housing on said first side of said bed;

(d) said box front is recessed at a lower portion to fit over a wheel well on said first side of said bed.

BRIEF DESCRIPTION OF THE DRAWINGS

The invention will be further understood from the drawings herein and description thereof wherein

FIG. 1 is a lateral cross-sectional top down view taken along line 1—1 of FIG. 2 in the direction of the arrows of a preferred embodiment of the present carry-all box mounted on a plastic liner on a "TOYOTA" pick-up truck bed, with the box shown in solid lines in its forward lateral position and in dotted lines in its rearward pivoted position, wherein the proportions are drawn approximately to a scale of 15 inches of actual truck bed and box to 1.0 inch of drawings, of a "TOYOTA" pick-up truck;

FIG. 2 is a cross-sectional view taken generally along line 2—2 of FIG. 1 in the direction of the arrows, of a typical metal floor pick-up truck bed With the present box pivotally mounted thereon in its forward lateral position and, for clarity, showing only two of the rollers;

FIG. 3 is a top down view of a double jointed pivot structure for the box with the box shown in its forward lateral position;

FIG. 4 is a view of the box of FIG. 3 shown in a fully pivoted longitudinally oriented position and lying adjacent the wheel well housing of a pick-up truck, and with a heavy duty the double jointed pivot means in an approximate orientation which allows such positioning of the box side adjacent to the inner side of said housing;

FIG. 5 is a side view of the double jointed pivot structure taken in the direction of arrow 5 of FIG. 4;

FIG. 6 is cross-sectional view of a variation the pivot means of FIG. 1 as affixed to the side of a solid bed liner;

FIG. 13 is a side view of a pick-up truck and the present box mounted therein in its pivoted longitudinal position, FIG. 14 is a top down view of FIG. 13 with portions of the box lid broken away for clarity to show the lid hinge;

FIG. 15 is a cross-sectional view taken along line 15—15 of FIG. 14 in the direction of the arrows;

FIG. 16 is a cross-sectional view taken along line 16—16 of FIG. 2 in the direction of the arrows and showing a variation of the roller means; and FIG. 17 is a view of FIG. 16 taken in the direction of arrow 17.

DETAILED DESCRIPTION

Figure 1:
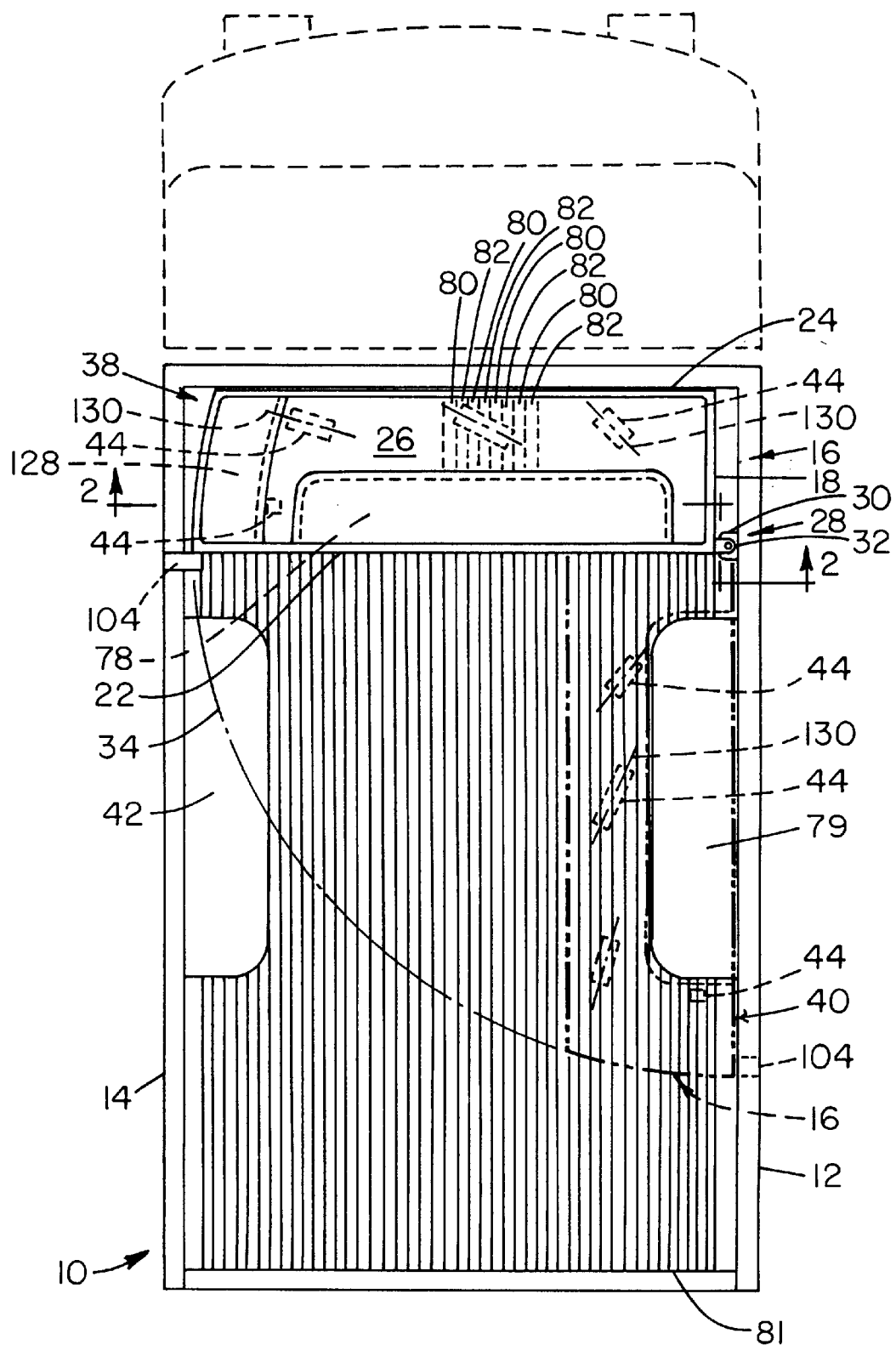
FIG. 1 shows the bed an box in substantially accurate relative proportions, and the other figures show the various structures out of proportion for purposes of clarity.

Referring to the drawings and with particular reference to the claims hereof, the present carry-all box which can be of metal, plastic or wood, or other material, in its preferred embodiments and in combination with a vehicle bed generally designated 10 having a floor 11 and first 12 and second 14 sides, may be characterized as an elongated, generally rectangular carry-all box 16 having first 18 and second ends 20, a front side 22 and a rear side 24, and bottom means 26 to which said ends and sides are affixed and extend generally upwardly, pivot means generally designated 28 having a pivot axis 29 and cooperating pivot hinge components 30 on said bed adjacent or affixed to said first side 12 thereof, and 32 on said first end 18 of said box for allowing said box to pivot in an arc path 34 substantially in the plane 36 of said bed or liner thereon between a generally lateral forward position 38 and a generally, longitudinal rearward position 40 relative to said bed, said ends, sides and bottom of said box being dimensioned to extend substantially all the way laterally across the bed in its forward position, while allowing said second end 20 to clear any obstruction which may be in its arc path such as bed side 14 or wheel well housing 42 as said box is being swung or pivoted to its rearward position 40.

The pivot means 28 should be quite sturdy such that if one or more rollers (term includes wheels) such as 44 are not desired or practical for some reason in order to prevent downward tilting of end 20 of the loaded box, such roller means would not have to be used. Especially sturdy pivot means for preventing pivoting are shown in FIGS. 2 thru 8 as comprising a pair of bearing members 46 and 48 affixed in vertical alignment to upper and lower portions respectively, of first end 18 of the box, which end is preferably of reinforced construction and a post means generally designated 49 rotatably mounted in said bearing means. Such post means may comprise the hook-like studs 59, 61 of FIGS. 2 and 12, the long tubular bushing 50 of FIGS. 7 and 8, the long pins 63 of FIGS. 3, 4 and 5, the short pins 65, 67 of FIG. 6, the bolt 69 of FIG. 11, the stud 53 of FIG. 9, and the stud 100 of FIG. 10.

The studs 59, 61 are preferably affixed vertically to the first side 12 of the truck bed, e.g., by welding, brazing or the like to a steel or aluminum plate 71 which in turn is welded or brazed at convenient locations 73 to side 12 of the bed.

In FIG. 6, a plate 75 equivalent to plate 71 is provided with projections 77 which bear against the valley walls 82 of plastic or elastomeric bed liner 81 to rigidify the plate mounting when it is affixed to the side 12 by threaded screws 83 or the like. Bearing segments 85, 87 are welded or the like to plate 75 and bored to receive pins 65, 67 respectively to pivotally mount the box.

Figure 9:
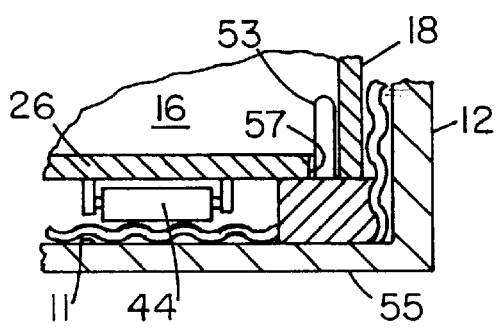
FIG. 9 shows a variation of the pivot means.

It will be apparent, of course, that other known pivot means may be employed, such as a round shaft or stud 53 as shown in FIG. 9 affixed to a base plate 55 which is affixed to the vehicle bed floor 10. The bottom or floor means 26 of the box is provided with a close tolerance bearing aperture 57 which is slid over the stud for pivoting of the box therearound.

Referring to FIGS. 3, 4 and 5, an alternative and double jointed pivot means generally designated 58 is shown as comprising the aforesaid bearing members 46,48, studs 59, 61, and a pair of heavily constructed arms 60, 62. Arm 60 is provided with bearing bores 64, 66 and arm 62 is provided with bearing bores 68 and 70. Pins 72, 74 and studs 59, 61 respectively as shown, pivotally interconnect bearing members 46, 48 with arm 60, arm 62 with arm 60, and arm 62 with studs 59 and 61.

This double jointed arrangement allows lateral movement of the first end 18 of the box away from side 12 such that recess 78 formed in the box to accommodate wheel wall housing 79 can be eliminated and still allow the box to lie sufficiently close to side 12 to allow easy access to the entire box.

Referring to FIGS. 1 and 2, in FIG. 1 the scaled down (one inch per 15 inches of actual of bed) dimensions, within practical measuring accuracy, of a "TOYOTA" pick-up truck bed and corrugated plastic or elastomeric liner 81 are shown, and in FIG. 2 the conventional ribbed shape of a pick up truck metal bed floor is shown. The rollers 44, with respect to their dimensions, number and positioning are shown as an example of how to place a series of rollers such that at least a substantial portion of the contact or rolling surface of at least one of them will bear on the top surface 80 of at least one rib or corrugation of the bed or liner during pivoting or swinging of the box thru its entire arc path 34. Any number of such rollers and of any convenient size may be employed to accomplish the objectives of allowing the rolling, pivotal action of the box to proceed smoothly without bothersome interruptive bumping from the valleys 82 of a plastic liner or corrugations in a metal truck bed per se. The rollers may be of any material, e.g., plastic, hard rubber or metal, which does not easily compress such as to deform under load into said valleys and generate significant resistance to rolling.

Figure 7:
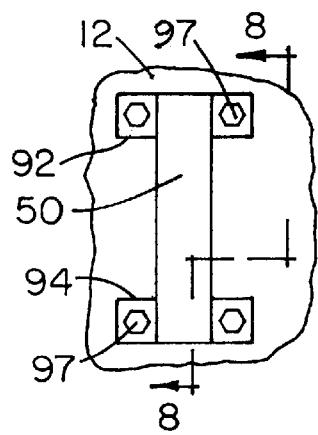
FIG. 7 is a view of a variation of the pivot means and the mounting of one component thereof to the truck side, as taken in the direction of arrow 7 in FIG. 6.
Figure 8:
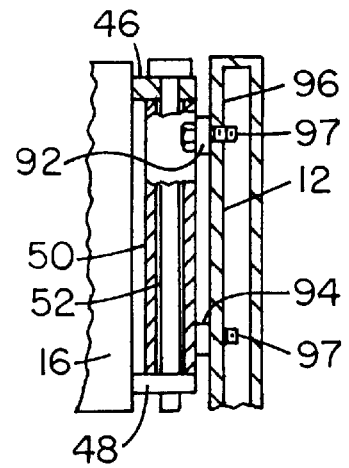
FIG. 8 is a cross-sectional view of FIG. 7 taken in the direction of line 8—8 in FIG. 7, with other portions broken away for clarity.

Referring to FIGS. 7 and 8, the bushing 50 is shown as welded or the like to a pair of brackets 92, 94 which are affixed to the inner metal side 96 of the truck side 12, preferably by heavy, self-tapping metal screws 97. A heavy pin 52 is then dropped thru the close tolerance bores 54 of the bearing members 46 and 48 of bushing 50.

Figure 10:
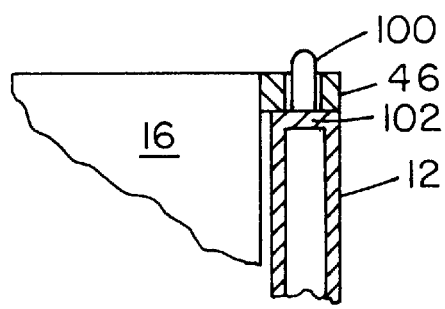
FIG. 10 shows another variation of the pivot means.

A further variation of the pivot means is shown in FIG. 10 wherein a stud 100 is fixed as by welding to the upper edge or top 102 of side 12, and a bearing member such as previously described 46 on the box end is simply placed thereover. With such single pivot point construction it is advisable to provide roller means at the first end section as well as at the second end section to provide good stability to the box.

Figure 11:
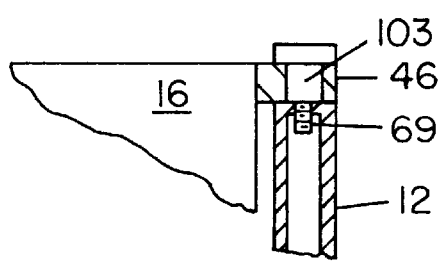
FIG. 11 shows a further variation of the pivot means.

In FIG. 11, a bolt 69 replaces the stud 100 of FIG. 10 and is threaded thru the top 102 of side 12. Shank portion 103 of the bolt provides a journal for the bearing aperture in bearing 46 and also a stop to prevent tightening of member 46 against the top 102.

Suitable latching means are preferably provided for stabilizing the box in its forward and rearward positions. Such means generally indicated as 104 in dotted line in FIG. 1 may comprise any type of latch and lock such as latch and pad lock, a sliding bolt means, a beveled bolt door latch and lock, or the like. Also, handle means such as 106 may be conveniently placed on the box to assist the operator in swinging the box.

Referring further to FIGS. 13–15, it is preferred that the hinge 108, preferably a piano type hinge, for the box lid 110 be placed at the rear side 24 of the box such that the lid front 112 can be easily lifted at the vehicle side 12 to expose the box interior. Lock means 114 may be provided on the lid and box front 22.

Figure 12:
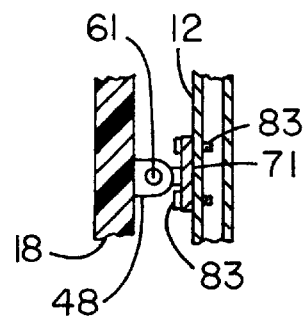
FIG. 12 is a cross-sectional view of the pivot means of FIG. 2 taken along line 12—12 thereof in the direction of the arrows and showing a screw bolt connection to the side of the truck bed rather than a weld.

Referring to FIGS. 12, 16 and 17, a variation in roller or wheel structure is shown as comprising a wheel 116, preferably rubber tire, solid or pneumatic, having a hub 117, mounted on axle 118 which is fixed between legs or walls 120, 122 extending down from the upper level of bottom 26 of the box and providing wheel cavity 126. The said upper level constitutes the portions of bottom 26 which have been elevated, where necessary, to accommodate the wheel well housing, e.g., recess 78 for wheel housing 79, and recess 128 tier wheel housing 42. It is noted that should multiple wheels 116 be desired, walls 120, 122, or equivalent wheel supporting structure, and cavity 126 can be extended, such as all the way to rear side 24 to provide mountings for the multiple wheels. It is preferred that any such wheels 116 be mounted on radial lines such as 130 of the pivot axis 29, and that the tire portions 132 be proportioned as to be too wide to enter down into any valley 82 in the bed floor or a liner thereon.

The invention has been described in detail with particular reference to preferred embodiments thereof but it will be understood that variations and modifications will be effected with the spirit and scope of the invention.

I claim:

1. A carry-all box adapted for mounting on a vehicle bed having a forward end section and a rearward end section, a floor, first and second bed sides, a wheel well projecting upwardly from said floor adjacent each said bed side approximately at a longitudinal mid portion of each said side, and further having a first pivot hinge component positioned on said bed forward of the wheel well adjacent said first bed side, said box having an elongated, generally rectangular configuration and having first and second end sections, a front box side and a rear box side, and bottom means to which said end sections and said front and rear box sides are affixed and extend generally upwardly, pivot means having a pivot axis and a second pivot hinge component on said first end section adapted to pivotally mount on said first pivot hinge component on said vehicle bed for allowing said box to pivot and swing in an arc path substantially in a plane parallel to the plane of said bed floor between a generally lateral forward position and a generally longitudinal rearward position relative to said bed, said end sections, sides and bottom means of said box being dimensioned to extend substantially all the way laterally across the bed in its forward swung position and to encompass said wheel well adjacent said first bed side in its longitudinal rearward swung position while allowing said box to clear any obstruction which may be in its arc path such as a bed side or wheel well housing.

2. The box of claim 1 wherein a lower front portion of said box is recessed to fit over a wheel well housing adjacent said first side of said bed.

3. The box of claim 1 wherein at least one wheel is mounted on said box at or adjacent to its second end section, wherein the rotational axis of said wheel is on a radial line of said pivot axis, and wherein the periphery of said wheel extends below the lowermost portion of said bottom.

4. The box of claim 3 wherein a tire portion of said wheel has a substantially flat contact surface and has a lateral dimension sufficient to bridge and ride on the top surfaces of at least two floor ribs or liner ribs throughout said arc path, and wherein said dimension is from about three inches to about six inches.

5. The box of claim 1 wherein roller means are provided on said box for contacting said bed floor and rollably supporting said box.

6. The box of claim 5 wherein said roller means is dimensioned and oriented to bridge at least one gap in a corrugated truck bed floor or bed liner for allowing smooth rolling motion of said roller means thru said arc path.

7. The box of claim 5 wherein a lower front portion of said box is recessed to fit over a wheel well housing on said first side of said bed.

8. The box of claim 1 wherein at least one wheel is mounted on said box at or adjacent to its second end section, wherein the rotational axis of said wheel is on a radial line of said pivot axis, wherein the periphery of said wheel extends below the lowermost portion of said bottom, and wherein at least two pivot structures are provided on vertically spaced portions of said first end of said box to prevent tilting of said box from said pivot axis.

9. The combination of a carry-all box mounted on a vehicle bed having a forward end section and a rearward end section, a floor, first and second bed sides, a wheel well projecting upwardly from said floor adjacent each said bed side approximately at a longitudinal mid portion of each said side, and further having a first pivot hinge component positioned on said bed forward of the wheel well adjacent said first bed side, said box having an elongated, generally rectangular configuration and having first and second end sections, a front box side and a rear box side, and bottom means to which said end sections and said front and rear box sides are affixed and extend generally upwardly, pivot means having a pivot axis and a second pivot hinge component on said first end section adapted to pivotally mount on said first pivot hinge component on said vehicle bed for allowing said box to pivot and swing in an arc path substantially in a plane parallel to the plane of said bed floor between a generally lateral forward swung position and a generally longitudinal rearward swung position relative to said bed, said end sections, sides and bottom means of said box being dimensioned to extend substantially all the way laterally across the bed in its forward swung position and to encompass said wheel well adjacent said first bed side in its longitudinal rearward swung position while allowing said box to clear any obstruction which may be in its arc path such as a bed side or wheel well housing.

10. The combination of claim 9 wherein said roller means is dimensioned and oriented to bridge at least one gap in a corrugated truck bed floor or bed liner for allowing smooth rolling motion of said roller means thru said arc path.

11. The combination of claim 9 wherein a lower front portion of said box is recessed to fit over a wheel well housing on said first side of said bed.

12. The combination of claim 9 wherein at least one wheel is mounted on said box at or adjacent to its second end section, wherein the rotational axis of said wheel is on a radial line of said pivot axis, wherein the periphery of said wheel extends below the lowermost portion of said bottom, and wherein at least two pivot structures are provided on vertically spaced portions of said first end of said box to prevent tilting of said box from said pivot axis.

13. A carry-all box adapted for mounting on a vehicle bed having a floor and first and second sides and a pivot hinge component, said box having an elongated, generally rectangular configuration and having first and second end sections, a front side and a rear side, and bottom means to which said end sections and said front and rear sides are affixed and extend generally upwardly, pivot means having a pivot axis and a pivot hinge component on said first end section adapted to pivotally mount on a pivot hinge component on said vehicle bed for allowing said box to pivot and swing in an arc path substantially in a plane parallel to the plane of said bed floor between a generally lateral forward position and a generally longitudinal rearward position relative to said bed, said end sections, sides and bottom means of said box being dimensioned to extend substantially laterally across the bed while allowing said box to clear any obstruction which may be in its arc path such as a bed side or wheel well housing, wherein roller means are provided on said box for contacting said bed floor and rollably supporting said box, and wherein said roller means is dimensioned and oriented to bridge at least one gap in a corrugated truck bed floor or bed liner for allowing smooth rolling motion of said roller means thru said arc path.

14. The box of claim 13 wherein said roller means is axially mounted on a radial line of said pivot axis.

15. The box of claim 13 wherein said roller means consists of a plurality of rollers at least some of which are mounted on different radial lines of said pivot axis.

16. A carry-all box adapted for mounting on a vehicle bed having a floor and first and second sides and a pivot hinge component, said box having an elongated, generally rectangular configuration and having first and second end sections, a front side and a rear side, and bottom means to which said end sections and said front and rear sides are affixed and extend generally upwardly pivot means having a pivot axis and a pivot hinge component on said first end section adapted to pivotally mount on a pivot hinge component on said vehicle bed for allowing said box to pivot and swing in an arc path substantially in a plane parallel to the plane of said bed floor between a generally lateral forward position and a generally longitudinal rearward position relative to said bed, said end sections, sides and bottom means of said box being dimensioned to extend substantially laterally across the bed while allowing said box to clear any obstruction which may be in its arc path such as a bed side or wheel well housing, wherein said pivot means is double jointed to allow lateral movement of said box as well as pivotal movement thereof whereby said box can be pivoted to lie substantially longitudinally of said bed and adjacent the inner side of a wheel well housing on said first side of said bed.

17. The combination of a carry-all box pivotally mounted on a vehicle bed having a floor and first and second sides and a pivot hinge component, said box having an elongated, generally rectangular configuration and having first and second end sections, a front side and a rear side, and bottom means to which said end sections and said front and rear sides are affixed and extend generally upwardly, pivot means having a pivot axis and a pivot hinge component on said first end section pivotally mounted on a pivot hinge component on said vehicle bed for allowing said box to pivot in an arc path substantially in a plane parallel to the plane of said bed between a generally lateral forward position and a generally longitudinal rearward position relative to said bed, said end sections, sides and bottom means of said box being dimensioned to extend substantially laterally across the bed while allowing said second end section to clear any obstruction which may be in its arc path such as a bed side or wheel well housing, wherein roller means are provided on said box for contacting said bed and rollably supporting said box, and wherein said roller means comprises a plurality of rollers which are oriented to bridge gaps in a corrugated floor or truck bed liner for allowing smooth rolling motion of said roller means thru said arc path.

18. The combination of claim 17 wherein a front portion of said box is recessed to fit over a wheel well on said first side of said bed.

19. The combination of a carry-all box pivotally mounted on a vehicle bed having a floor and first and second sides and a pivot hinge component, said box having an elongated, generally rectangular configuration and having first and second end sections, a front side and a rear side, and bottom means to which said end sections and said front and rear sides are affixed and extend generally upwardly, pivot means having a pivot axis and a pivot hinge component on said first end section pivotally mounted on a pivot hinge component on said vehicle bed for allowing said box to pivot in an arc path substantially in a plane parallel to the plane of said bed between a generally lateral forward position and a generally longitudinal rearward position relative to said bed, said end sections, sides and bottom means of said box being dimensioned to extend substantially laterally across the bed while allowing said second end section to clear any obstruction which may be in its arc path such as a bed side or wheel well housing wherein said pivot means is double jointed to allow lateral movement thereof whereby said box can be pivoted to lie substantially longitudinally of said bed and adjacent a wheel well housing on said first side of said bed.

20. The combination of a carry-all box pivotally mounted on a vehicle bed having a floor and first and second sides and a pivot hinge component, said box having an elongated, generally rectangular configuration and having first and second end sections, a front side and a rear side, and bottom means to which said end sections and said front and rear sides are affixed and extend generally upwardly, pivot means having a pivot axis and a pivot hinge component on said first end section pivotally mounted on a pivot hinge component on said vehicle bed forward of a wheel well adjacent one of said first or second sides for allowing said box to pivot in an arc path substantially in a plane parallel to the plane of said bed between a generally lateral forward position and a generally longitudinal rearward position relative to said bed, said end sections, sides and bottom means of said box being dimensioned to extend substantially laterally across the bed while allowing said second end section to clear any obstruction which may be in its arc path such as a bed side or wheel well housing, wherein at least one wheel is mounted on said box at or adjacent to its second end section, wherein the rotational axis of said wheel is on a radial line of said pivot axis, and wherein the periphery of said wheel extends below the lowermost portion of said bottom.

21. A combination of claim 20 wherein the tire portion of said wheel has a substantially flat contact surface and has a lateral dimension sufficient to bridge and ride on the top surfaces of at least two floor ribs or liner ribs throughout said arc path.

22. The combination of claim 21 wherein said dimension is from about three inches to about six inches.

* * * * *

UNITED STATES PATENT AND TRADEMARK OFFICE
CERTIFICATE OF CORRECTION

PATENT NO. : 6,007,128
DATED : December 28, 1999
INVENTOR(S) : ROBERT S. HINES, JR.

It is certified that error appears in the above-identified patent and that said Letters Patent is hereby corrected as shown below:

Claim 1: line 21, delete "its" and insert ---said generally lateral---;
        line 22, delete "its" and insert ---said generally---;
        line 25, delete "its" and insert ---said---;
        lines 25 and 26, delete "such as a bed side or wheel well housing".
    Claim 9: line 22, delete "its" and insert ---said generally---;
        line 25, delete "its" and insert ---said---;
        lines 25 and 26, delete "such as a bed side or wheel well housing".
    Claim 13: line 9, delete "a" and insert ---said---;
    Claim 16: line 7, after "upwardly" insert a comma;
        line 9, delete "a" and insert ---said---;
    Claim 17: line 9, delete "a" and insert ---said---;
    Claim 19: line 9, delete "a" and insert ---said---;
    Claim 20: line 9, delete "a" and insert ---said---;
        last line after "bottom" insert ---, and wherein only one wheel is provided and at least two pivot structures are provided on vertically spaced portions of said first end of said box to prevent tilting of said box from said pivot axis---.
    Claim 21: line 1, delete "the" and insert ---a---.

Signed and Sealed this

Sixth Day of March, 2001

*Attest:*

NICHOLAS P. GODICI

*Attesting Officer*      *Acting Director of the United States Patent and Trademark Office*